Jan. 7, 1936.     F. J. TARRIS     2,027,210
AIRCRAFT WHEEL BRAKE
Filed Dec. 27, 1933     6 Sheets-Sheet 3

INVENTOR
Frederick John Tarris
by his attorneys
Byrnes, Stebbins, Parmelee & Blenko Jan. 7, 1936. F. J. TARRIS 2,027,210
AIRCRAFT WHEEL BRAKE
Filed Dec. 27, 1933 6 Sheets-Sheet 5

Fig.5.

INVENTOR
Frederick John Tarris
by his attorneys
Byrnes, Stebbins, Parmelee & Blenko Jan. 7, 1936.  F. J. TARRIS  2,027,210
AIRCRAFT WHEEL BRAKE
Filed Dec. 27, 1933  6 Sheets-Sheet 6

INVENTOR
Frederick John Tarris
by his attorneys
Byrnes, Stebbing, Parmelee & Blenko Patented Jan. 7, 1936

2,027,210

UNITED STATES PATENT OFFICE 2,027,210

AIRCRAFT WHEEL BRAKE

Frederick John Tarris, Silvertown, London, England, assignor to The India Rubber, Gutta Percha and Telegraph Works Company Limited, Aldwych, London, England, a British Company Application December 27, 1933, Serial No. 704,077
In Great Britain February 15, 1933

8 Claims. (Cl. 244—2)

This invention forms a continuation in part of the invention forming the subject of U. S. Patent application Serial No. 654,805 filed February 2, 1933, now Patent No. 2,017,928, and relates to brakes for aircraft wheels and has for its object to provide an improved means whereby when it is desired to turn the aircraft whilst moving along the ground to one side or the other, the brake pressure on the wheels or wheel sets of the undercarriage which are respectively situated on either side of the central vertically and longitudinally extending plane of symmetry can be differentially adjusted.

The invention comprises improvements in or relating to a control mechanism for the operation of aircraft wheel brakes, which control mechanism is of the type comprising a main control device which is operable by the aircraft pilot to control the simultaneous operation of the two brake mechanisms respectively associated with the wheels located on opposite sides of the central longitudinal plane of symmetry of the aircraft, and a pair of auxiliary control devices one of which communicates with the brake or brakes of the wheel or wheels on the other side of the said plane (referred to hereinafter as one set of brakes or one brake set), and the other of which communicates with the brake or brakes of the wheel or wheels on the other side of the said plane, the said auxiliary control devices being mounted in the aircraft so that each may be individually operated for the purpose of producing a differential operation of the two brake sets. This type of mechanism is to be understood as being referred to by the phrase "A control mechanism of the type specified" when this phrase is employed in the following specification and appended claims.

In a control mechanism of the type specified the auxiliary control devices are intended to be operated for the purpose of steering when landing, by movement of the rudder-bar or equivalent mechanism of the aircraft and will be so arranged that when the rudder-bar is turned or its equivalent mechanism operated to steer in one direction that auxiliary control device of the pair provided will be operated which communicates with the corresponding set of brakes, modification of the action of which by the said device aids the said turning movement. Movement of the rudder-bar or equivalent mechanism to steer in the opposite direction will be arranged to operate the other control device and produce an opposite differential braking effect.

In order that the following specification and appended claims may be brief and clear the term "rudder-bar" is employed hereinafter to refer to the rudder-bar of the aircraft or to any equivalent device or mechanism and is to be understood as including such equivalent mechanisms.

According to the invention there is provided for the operation of aircraft wheel brakes, a control mechanism of the type specified wherein each auxiliary control device is provided with an actuator which is movable into and out from positions for co-operation with the rudder-bar, said actuators being such that in the non-co-operative position they will leave the rudder-bar free from encumbrance by them.

According to the invention also, there is provided for the operation of aircraft wheel brakes, a control mechanism of the type specified having means which operatively connect or are capable of operatively connecting the rudder-bar with the auxiliary control devices, wherein each auxiliary control device serves only brakes on one side of the said plane and comprises means for releasing the braking pressure and an actuator for connecting the said releasing means with the rudder-bar whereby movement of the latter can produce a differential braking effect by release of braking pressure in the brakes on one side of the aforesaid plane substantially without alteration of the braking pressure in the brakes on the opposite side.

According to one preferred constructional form of the invention such control mechanisms have each an auxiliary control device comprising a valve controlling the braking pressure in its respective brake-set and loading means for the valve operated in accordance with the extent of operation of the main control device. The valve loading means of such a construction may conveniently be connected to the corresponding actuator so that the said loading means are operated in accordance with the movements of the actuator produced by movement of and by virtue of its co-operation with the rudder-bar.

Preferably the actuators of the auxiliary control devices in any of the forms of the invention given above are such as to be brought into or out of positions for co-operation with the rudder-bar by operation of the main control device. Preferably also the auxiliary control devices have means to provide an operative condition for the actuators and to release them from the said condition, which means are such that the said condition cannot be established for either actuator until the rudder-bar has been moved away from the said actuator to a position at which no differential adjustment of the brakes is occasioned. In such a construction each auxiliary control device conveniently comprises in combination two reciprocable devices one of which is operated by and the other which controls pressure-fluid passing to the respective brake-set, and a releasable coupling operatively connecting the two devices and such that it can couple them when one has reached or is approaching one end of its stroke, and can be released when desired to permit the one device to move independently of the other. The releasable coupling preferably comprises a toggle linkage which is automatically brought into a position for locking when one of the reciprocable devices reaches or approaches one end of its stroke.

A control mechanism according to the invention, and the aircraft brakes controlled thereby, are preferably operated by gaseous pressure, which will normally be air-pressure and which is released from one or the other of the brake sets when the aircraft is to be turned. The mechanisms according to the invention can also be arranged, however, so that the brakes are operated by a liquid pressure or a vacuum, and such constructional forms are intended to be included in the scope of the present invention.

In order that the invention may be more clearly understood constructional examples thereof will be described in detail with reference to the accompanying drawings in which—

Similar reference numerals are employed to denote similar parts throughout all the figures of the drawings.

Figure 1:
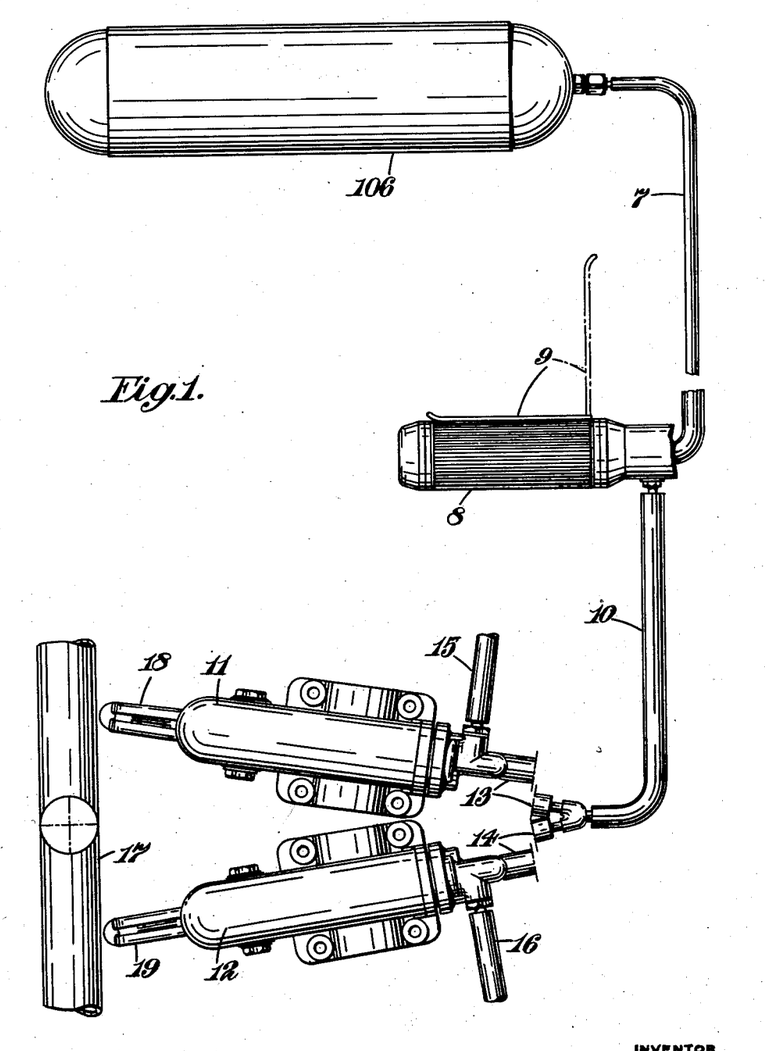
Figure 1 shows the arrangement of the connections between the main control and the auxiliary control devices of one form of a control mechanism according to the invention, with which form the brake mechanism is adapted to be operated by gaseous pressure.

In Figure 1 a reservoir for containing air under pressure is represented at 106 and is connected by means of the tubing 7 to the main control device 8 which is operated by the pilot to permit the air pressure to pass to the brakes. Locking means are represented at 9 which only permit the main control device to be operated when in the position shown in full lines, the position shown in dotted lines representing the locking position. The main control device as shown is constituted by a twist-grip control and when turned a valve is opened which allows air-pressure to pass through the tube 10 to the auxiliary control devices 11 and 12 by way of the branch tube connections 13 and 14. At the same time (i. e. on the initial operation of the main control) air is allowed to pass to both brake-sets on opposite sides of the centre line of the aircraft from the auxiliary control devices respectively associated with the two brake sets through the connections 15 and 16 on the said latter devices and communicating with the actual brake mechanisms which are not shown in the drawings. The auxiliary control devices 11 and 12 are shown as adapted to be operated directly by the rudder-bar 17, turning of which for steering purposes from the neutral position shown in the drawings brings it into contact with one or other of the members 18 or 19 associated with the auxiliary control devices 11 and 12 respectively and causing the operation thereof when moved by the rudder-bar.

Figure 2:
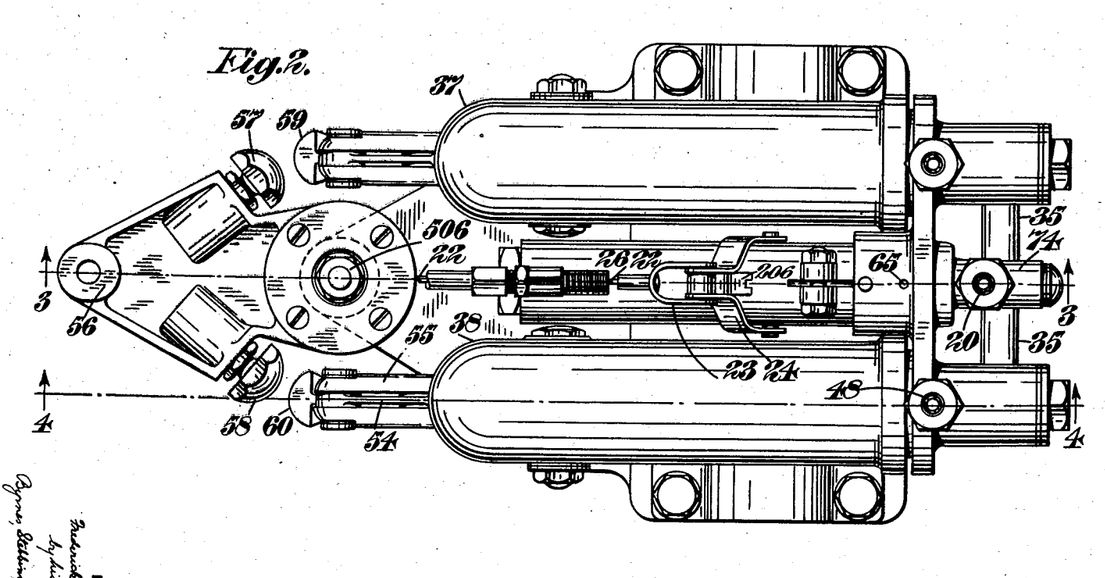
Figure 2 is a plan view of a main control device and auxiliary control devices assembled into a unitary form, a remote control mechanism for the main control device then being provided.
Figure 3:
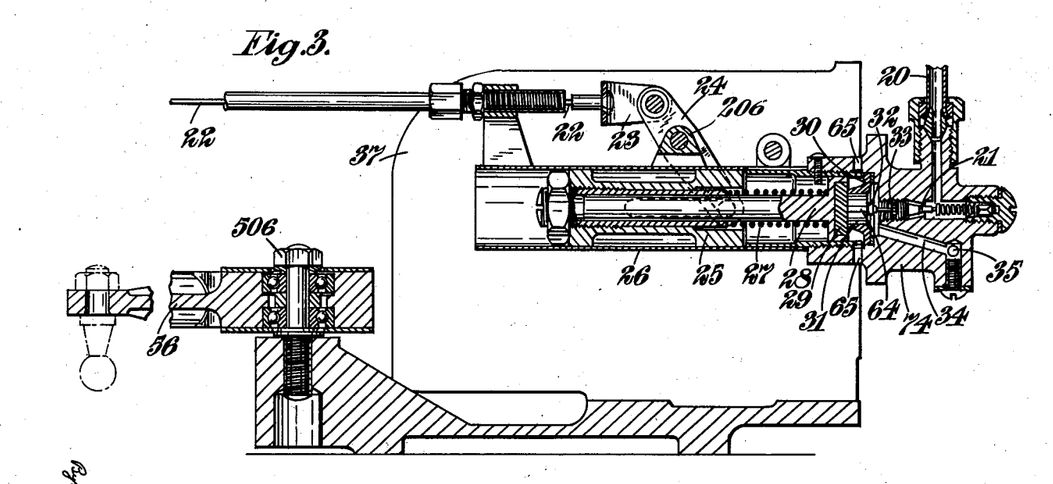
Figure 3 is a sectional elevation on the line 3—3 of Figure 2.
Figure 4:
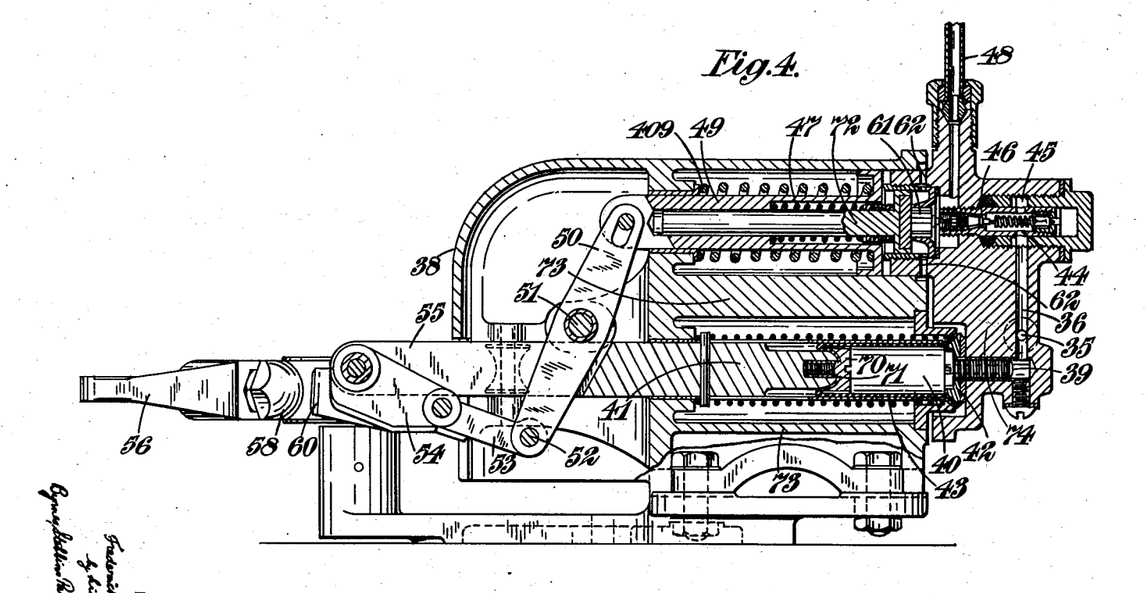
Figure 4 is a sectional elevation on the line 4—4 of Figure 2.

Figures 2, 3 and 4 show a modified form of construction in which the main control device is assembled in close proximity to the auxiliary devices and is also provided with means whereby a remote control may be effected by the pilot of the operation of the said main control device. Further, the operation of the auxiliary control device is effected indirectly from the rudder-bar or equivalent mechanism by means of a suitable coupling provided therebetween. The connections for the passage of compressed air between the main control and the auxiliary control devices are similar to those shown in Figure 1, air from the reservoir (not shown in Figure 2) passing to the main control through the tube 20 (Figure 3) to a valve 21 which is preferably of the type known under the trade name of "Schräder valve" mounted in the member 74. This valve is controlled by means of the cable 22 (of the type known under the registered trademark of "Bowden" cable) connected at one end to the member 23, which is pivotally connected to the stirrup-shaped lever 24, and having the other end controlled by the pilot. Movement of the lever 24 effects a longitudinal movement of the sleeve 25 slidably mounted in the cylinder 26 on an upstanding projection 206 formed on which cylinder the lever 24 is pivoted. Increased tension on the cable is arranged to move the sleeve to the right to the position shown in Figure 3 and thereby compressing the spring 27 which causes a return movement of the sleeve when the tension on the cable is released. Compression of the spring 27 causes movement of the piston 28 part of the stem of which is surrounded by the spring 27 located between the piston head and the sleeve 25 which surrounds the remainder of the stem in a manner permitting relative movement in the direction of the axis of the piston. The piston 28 is provided with a rubber face 29 which co-operates in the extreme right-hand position with a valve seating 30. The piston is provided with a cylindrical projection 31 at the rubber face which passes through a central axial orifice in the valve seating 30, and is provided further with a projection 32 for co-operation with a valve pin 33 to effect the opening of the valve 21 shown in an open position in Figure 3. The valve 21 when open allows air to pass from the supply-line 20 to the passage 34 and the pipes 35. As will be seen from Figures 2 and 4 the pipes 35 each communicate with a passage 36 provided in an auxiliary control device, a pair of which are shown at 37 and 38. The cylinder 26 is mounted by means of a screw-thread on the member 74 which forms a cross-connecting member between the main and auxiliary control devices.

Figure 4 shows a section through such an auxiliary control device, the devices 11 and 12 of Figure 1 being of a substantially similar construction. Compressed air passes, when the main control has been moved to put the brakes in operation, from the passage 36 in the member 74 to the passage 39 from whence it passes to a lower cylinder chamber 40 formed in the outer casing 73 attached to the member 74. This cylinder chamber is provided with a piston 41 between the head of which and the head 42 of the cylinder 40 is provided a rubber sleeve 43 which provides an air-tight container of variable volume. The piston 41 is constructed to be of a suitable shape to allow of the rubber sleeve being accommodated between the piston and the cylinder walls when the piston is moved to the right in Figure 4. The free circular edges of the rubber sleeve are gripped at one end between the cylinder head 42 and the cylinder walls, and at the other end between the piston 41 and a cap or piston head member 70 which has a screw portion 71 to secure it to the piston. The piston 41 is moved out to the position shown in Figure 4 by the passage of compressed air to the rubber-walled container.

Air may also pass when the main control is operated from the passage 36 through the holes 44 in a valve sleeve, which holes register with an annular passage 45 in the external member in which the valve sleeve is mounted. The passage 45 is arranged to be in communication with the passage 36. A further valve 46 which is also preferably of the "Schräder" type is provided in the path of the compressed air issuing from the conduit 36 and is normally held in the open position by a piston 72 of a construction similar to that of the piston 28 described in connection with the main control shown in Figure 3. The piston 72 is held in a position to cause the opening of the valve 46 by the spring 47. After passing the valve 46 air passes to the actual brake mechanism not shown in the drawings by means of the connection 48.

The piston 72 which is under the action of the spring 47 is mounted together with the spring in a second hollow piston 49 which is normally held by a surrounding spring 409 in the position shown in Figure 4 so as to maintain the first piston 72 in the extreme right hand position to open the valve 46. The hollow piston 49 is slidably mounted in a cylinder chamber formed in the outer casing 73, and relative sliding movement between the two pistons 49 and 72 is also possible. The left hand end of the piston 49 is pivotally connected to a lever 50 pivoted at 51 between its end-points on a supporting pivot formed or mounted on the external casing 73, and connected at its other end 52 by means of control elements 53, 54 to an extension 55 of the piston 41. The connections between the elements 54 and the piston extension 55, the element 53 and the lever 50, and between the elements themselves are all of a pivotal nature. The elements 53 and 54 are constructed so as to form a toggle linkage.

It will be seen that the movement of the piston 41 caused by operation of the main control device to apply the aircraft brakes causes the linkage to be extended to the position shown in Figure 4. It will also be appreciated that the operation of the devices 37 and 38 being identical, air will pass to the brakes so as to apply equally the brakes or brake-sets on either side of the centre line of the aircraft.

In the form of construction shown in Figures 2, 3 and 4 the auxiliary control devices are operated indirectly by the rudder-bar which is provided in operative connection with a device 56 which may be moved about a pivot 506. Movement of the rudder-bar from one side or the other is arranged to produce a pivotal movement of the member 56 which results in the co-operation of one of the members 57 or 58 provided thereon with one or other of the members 59 or 60 respectively associated with the auxiliary control devices 37 and 38. The members 59 and 60 are in rigid connection with the toggle-link 54 of their respective auxiliary control devices and are so positioned that when subjected to pressure from the corresponding member 57 or 58 the toggle linkage is maintained in an extended or locked position and a return movement of the piston extension 55 cannot therefore cause the collapse of the toggle linkage but turns the lever 50 about the pivot 51 thereby effecting movement of the piston 49 against the action of the spring 409. Spring pressure on the valve operating piston 72 is thus reduced and the air-pressure causes it to move to a position in which the valve 46 may close under the air pressure and the rubber face of the piston 72 itself move away from the annular seating. Closing of the valve 46 prevents further air pressure passing to the brakes and the movement of the plunger from its seating permits air pressure already existing in the brake mechanism to escape by means of the flutes 61 provided on the cylindrical surface of the piston extension through the passage 62 to exhaust. Release of one or other of the brake-sets on opposite sides of the centre line of the aircraft is therefore effected by the turning movement of the rudder-bar.

The action of the piston 72 in allowing the brake pressure to be released will be better understood from the following further description of the main control device release of which, that is to say, release of tension on the cable 22, permits the sleeve 25 to move to the left under the pressure of the spring 27 and air pressure on the piston 28 causes it to make a following movement. The piston movement allows the valve 21 to be closed by the spring of the valve 46 and air pressure from the brakes not already released to exhaust through the auxiliary control devices is released to exhaust through the flutes 64 in the member 31 across the valve seating 30 and through the passages 65.

Pistons 41 may also be subjected to spring pressure tending to move them into a position in which the toggle linkage collapses, which tendency is only opposed by air pressure applied by operation of the main control device. The collapsed position is then assumed as soon as the brakes are released by the main control and the auxiliary devices are then in a position readily to be brought into operation by the initial application of the brakes by the main control. It will be noticed that this collapsed position leaves the rudder-bar, in the case of direct control of the auxiliary devices by the rudder-bar, as in the construction illustrated in Figure 1, free from any encumbrance of members causing the operation of the auxiliary devices.

It will be seen also that all the brakes in aircraft brake control mechanisms according to the invention are equally applied in the first instance even although the rudder-bar may be moved out of its neutral position since movement of the rudder-bar out of this position only occasions the release of the pressure of one or other of the brake-sets after the toggle linkage has moved out to its fullest extended and locked position. Since this latter movement is not possible when the rudder-bar is displaced from its neutral or approximately neutral position the auxiliary control device in question cannot come into operation. Initial application of the brakes on landing in an equal manner is thus ensured and greater safety is secured thereby since an initial (i. e. presumably while travelling at high speed) application of brakes in a differential manner would probably result in the overturning of the aircraft.

Figure 5:
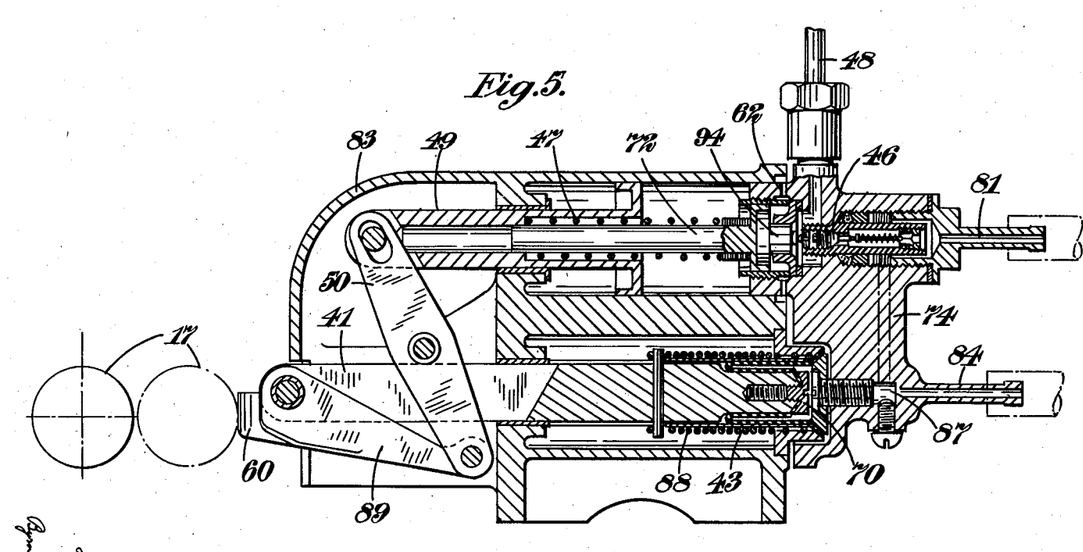
Figure 5 is a central longitudinal section in a vertical plane of a modified form of auxiliary control device to that shown in Figure 4.
Figure 6:
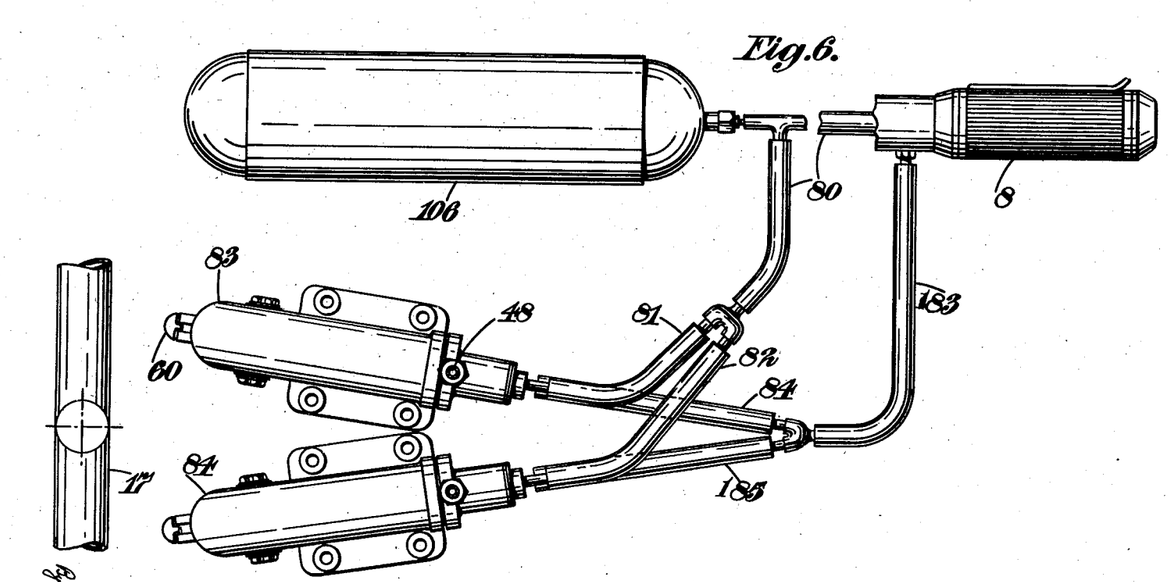
Figure 6 shows the arrangement of the connections between the main control device and auxiliary control devices when the form of auxiliary control device shown in Figure 5 is employed.

Figure 5 shows a sectional view of an auxiliary control device which is a modification of that shown in Figure 4, and Figure 6 shows the connections provided between a reservoir for compressed air, a main control device and a pair of auxiliary control devices of a construction as shown in Figure 5.

The reservoir for compressed air is shown at 106 in Figure 6 and branched pipe connections 80 pass respectively from the reservoir to a main control device represented at 8 and the auxiliary control devices represented at 83 and 84 respectively, that branch proceeding to the latter devices being itself branched at 81 and 82 so as to pass to both auxiliary devices. The main control device 8 has a pipe connection 183 passing therefrom to branch pipe connections 184 and 185 which also pass to the auxiliary control devices. The main control device, which may be any suitable form of valve operable to allow or to restrain the passage of air from the reservoir, is shown in Figure 6 as a twist-grip control similar to that shown in Figure 1.

Each auxiliary control device 83 (or 84) comprises an external casing similar to that denoted by the reference numeral 73 in Figure 4, and comprises also two reciprocable devices or pistons denoted by 41 and 49 similar to the pistons shown in Figure 4, and referred to in this latter figure by similar reference numerals.

The lower reciprocable device or piston 41 is similarly provided with a head member 70 for securing the end of a rubber sleeve 43, the other end of which sleeve is secured in the head of the cylinder in which the piston 41 reciprocates. A fluid channel 87 is provided in the member 74 which is secured to the external casing in a similar manner to the way in which the member 74 is secured to the outer casing 73 as shown in Figure 4. The passage 87 is in communication with the pipe 184 the passage of air through which is controlled by the main control device. A spring 88 is provided to act on the piston 41 and tends to maintain it in the position shown in Figure 5, displacement from which position is effected against the action of the spring by compressed air passing through the passage 87 from the pipe 184 when the main control device is operated.

The piston 41 is provided at its other end with a link member 89 carrying or formed integrally with a member or actuator 60 for co-operation with the rudder-bar, said member 89 being pivotally connected at its other end with the swinging arm 50, which at its other end is pivotally connected to one end of the piston 49. On account of this link connection the piston 41 when in its normal inoperative position as shown in Figure 5 requires the piston 49 to be in its extreme left-hand position and the compressive force exerted by the spring 47 upon the auxiliary piston 72 is at a minimum. The auxiliary piston 72 is similar to the piston member denoted by the same reference numeral in Figure 4 as regards its form and method of mounting and operation, and is similarly arranged to control the action of a valve 46 (e. g. a "Schräder" valve) provided to control the passage of air to the conduit 48 leading to the braking mechanism. The fluid conduit leading to this valve, however, is now provided in direct connection with the reservoir the branch pipe 81 being connected to this conduit. The valve has no direct fluid connection with the fluid container of variable volume 43.

In the normal inoperative position shown in Figure 5, air pressure from the reservoir maintains the valve 46 closed against the action of the spring 47 which tends to move the piston 72 so as to open the valve. On operation of the main control device, however, compressed air passes to the conduit 87 and the lower piston member 41 is moved to the left the spring 47, consequent upon such movement, being compressed to an extent dependent upon the extent of operaton of the main control device, that is, upon the pressure of the air admitted to the rubber sleeve 43. The compression of the spring 47 causes the piston 72 to open the valve 46 and compressed air passes from the reservoir to the brakes until a pressure in the brake-set has been built up which is sufficient to move the piston 72 to the left by virtue of the pressure exerted on the face of the piston against the action of the spring 47. When this happens, air can escape from the brakes through the grooves 94 in the projecting portion of the piston and through the wire-drawing outlet 62. The valve 46 closes immediately the piston 72 makes any movement to the left, thereby cutting off communication between the pipe 48 and the reservoir.

It will be seen that in the arrangement described in connection with Figures 5 and 6 braking pressure is applied in accordance with the extent of operation of the main control device, the actual brake pressure existing in the brake-sets being respectively balanced against the compression produced in the spring 47 of the respective auxiliary control devices. It will be seen also that the member 60 is presented for co-operation with the rudder-bar or its equivalent mechanism upon operation of the main control device and in the present construction a differential braking effect is immediately achieved if the rudder bar is not located in its central position and it is not necessary to zeroize the rudder-bar before a differential effect can be obtained. The extent of the movement of the member 60 for co-operation with the rudder-bar is also in proportion to the extent of operation of the main control device. Each auxiliary control device is thus seen to comprise a valve controlling the braking pressure in its respective brake set, and loading means for the valve operated in accordance with the operation of the main control device. The loading means are also arranged to be modified according to the position of the rudder-bar.

The modified form of auxiliary control shown in Figure 5 may be provided in apparatus of the form shown in Figure 6 or may be provided in a unitary assembly such as shown in Figure 2 with the main control device, provided with attachments enabling the remote control of its operation to be effected, located between a pair of such auxiliary devices and a pipe 35 as shown in Figure 2 then being connected only with the chambers 40, the pipe 36 not then provided and the valve 46 arranged to control communication between the reservoir and the brakes. A difference between a control mechanism employing the modified form of auxiliary controls shown in Figure 5 from one employing auxiliary controls of the form shown in Figure 4 is seen in the fact that the former arrangement has auxiliary controls to control the braking, the simultaneous action of which auxiliary controls is controlled by the main control device and the action of which is also independently and separately modified by the respective auxiliary control devices. In both cases the main control device upon operation puts the auxiliary devices into a condition whereby movement of the rudder-bar causes one or the other of them to modify the braking effect differentially.

It will be readily understood that the form of construction shown in Figures 5 and 6 may be further modified with the object of reducing the extent of the pipe connections by providing an internal duct (as shown in dotted lines in Figure 5) in the member 74 to supply pressure fluid to the valve 46 from the fluid passage 87. The pipe connections 81 and 82 from the pressure fluid reservoir are then dispensed with. The actual braking pressure in this form of construction results from two reductions of the supply pressure, first at the main control device and secondly at the respective auxiliary control device. The regulation of the braking pressure is then found to be practically unaffected by the normal variations of the supply pressure. With such a construction the area of the lower piston is preferably such that a pressure of, say, approximately 40 lbs. loads the valve 47 to produce a braking pressure of approximately 30 lbs.

In all cases the constructions described in the foregoing specification have the auxiliary controls or the unitary assembly of such controls preferably provided with a suitable form of construction of their base portions to enable them to be conveniently mounted on a cross-member of the aircraft frame in proximity to the rudder-bar or associated or equivalent mechanism.

I claim:

1. For the operation of aircraft wheel brakes actuated by fluid pressure, a control mechanism comprising in combination a main control device to control the simultaneous operation of two sets of brakes respectively operative on wheels situated on opposite sides of the fore and aft centre line of the craft, a pair of auxiliary control devices and, to operate the latter, a rudder bar for the craft, each of which auxiliary control devices serves only one of the said brake sets and comprises a valve controlling the braking pressure in the respective brake set, loading means for the valve operated in accordance with the extent of operation of the main control device, means for releasing the braking pressure and an actuator for connecting the said releasing means with the rudder bar of the craft whereby movement of the rudder bar can produce a differential braking effect by release of braking pressure in the brakes on one side of the aforesaid plane substantially without alteration of the braking pressure in the brakes on the opposite side.

2. For the operation of aircraft wheel brakes, a control mechanism according to claim 1 having an operative connection between the valve loading means and the actuator of each auxiliary control device so that the said loading means are operated in accordance with the movements of the actuator produced by movement of and by virtue of its cooperation with the rudder bar.

3. For the operation of aircraft wheel brakes actuated by fluid pressure, a control mechanism comprising in combination a main control device to control the simultaneous operation of two sets of brakes respectively operative on wheels situated on opposite sides of the fore and aft centre line of the craft, a pair of auxiliary control devices, and to operate the latter, a rudder bar for the craft each of which auxiliary control devices serves only one of the said brake sets and comprises an actuator for the device, a valve controlling the braking pressure in the respective brake set, loading means for the valve forming part of an operative connection between the said valve and the actuator for the respective auxiliary control device and means to render the main control device operative on a part of said operative connection to control said loading means and at the same time cause the actuator to be moved into or out of positions for cooperation with the rudder bar, at which positions the actuator also controls said loading means in accordance with the position of the rudder bar.

4. For the operation of aircraft wheel brakes actuated by fluid pressure, a control mechanism according to claim 3 having the operative connection between the actuator and the loading means for the valve controlling the braking pressure, comprising a toggle linkage which can only become locked for the transmission of movement of the actuator to the loading means when the rudder bar is moved to a position at which no differential adjustment is occasioned.

5. For the operation of aircraft wheel brakes actuated by fluid pressure, a control mechanism according to claim 3 having each auxiliary control device fitted with a compound valve comprising firstly a release-valve normally open in a wire-drawing pressure outlet passage of the respective brake-set, a slidable element and an actuator attached thereto, and a resilient connection between the release-valve and the slidable element the extent of the movement of which and the degree of corresponding compression of the resilient connection depend on the operation of the main control device and also on the position of the rudder-bar which co-operates with the actuator, and secondly a supply-valve normally shut in the pressure supply-passage of the brake-set but thrust open by the release-valve when the said release-valve is closed by the slidable element and reclosed when the air-pressure in the brake-set has overcome the release-valve and its aforesaid resilient connection.

6. For the operation of aircraft wheel brakes actuated by fluid pressure, a control mechanism according to claim 3 wherein the main control device comprises a hand operated valve located in a supply conduit for fluid under pressure.

7. For the operation of aircraft wheel brakes actuated by fluid pressure, a control mechanism according to claim 3 wherein the main control device comprises a loaded valve controlling the braking pressure, a further valve located in the pressure fluid supply conduit and arranged so as to be opened by the loaded valve only when the loading thereon exceeds the pressure of the fluid in the braking mechanism, and hand operated remote control means for loading means of the loaded valve.

8. For the operation of aircraft wheel brakes actuated by fluid pressure, a control mechanism according to claim 3 wherein the main control device is provided with means for hand operated remote control and is assembled in a position between the auxiliary control devices so as to form a unitary structure therewith which may be mounted in the aircraft in a position close to the rudder bar and symmetrical with regard to the axis of rotation thereof.

FREDERICK JOHN TARRIS.